(12) United States Patent
Dorrell

(10) Patent No.: US 6,411,222 B1
(45) Date of Patent: Jun. 25, 2002

(54) METHOD OF SIGNALLING A STRUCTURE OF A CODE STREAM

(75) Inventor: Andrew James Dorrell, East Blaxland (AU)

(73) Assignee: Canon Kabushiki Kaisha, Tokyo (JP)

(*) Notice: Subject to any disclaimer, the term of this patent is extended or adjusted under 35 U.S.C. 154(b) by 6 days.

(21) Appl. No.: 09/708,478

(22) Filed: Nov. 9, 2000

(30) Foreign Application Priority Data

Nov. 12, 1999 (AU) .............................................. PQ4033

(51) Int. Cl.⁷ ................................................. H03M 7/00
(52) U.S. Cl. ....................................................... 341/5 D
(58) Field of Search ............................. 341/65, 67, 50, 341/106, 94

(56) References Cited

U.S. PATENT DOCUMENTS 5,838,265 A * 11/1998 Adolph ........................ 341/50
5,930,493 A   7/1999 Ottesen et al. .............. 395/500

* cited by examiner

Primary Examiner—Brian Young
(74) Attorney, Agent, or Firm—Fitzpatrick, Cella, Harper & Scinto (57) ABSTRACT

A method, an apparatus, and a computer program product for signalling a structure of a code stream comprising a plurality of code segments are disclosed. In the method, a code segment indexing order is determined based on a reference order for the code segments and a set of permutation values for modifying ordering of indices of the reference order. The code segment indexing order is used for signalling the structure of the code stream. The reference order is preferably dependent upon a predetermined coding process for producing the code stream. The code stream may relate to a decomposed, digital image, but may alternatively relate to audio and/or video data.

57 Claims, 5 Drawing Sheets

| Reference order | Permutation | Resulting index vector |
|---|---|---|
| tile | 3 | resolution level |
| component | 2 | component |
| resolution level | 1 | tile |
| subband | 4 | subband |
| block | 5 | block |
| layer | 6 | layer |

Fig. 5

METHOD OF SIGNALLING A STRUCTURE OF A CODE STREAM

FIELD OF THE INVENTION

The invention relates generally to data compression and in particular to processing a code stream for a digital image or the like.

BACKGROUND

Typically, during image compression a digital image and, in particular, image pixel data can be decomposed in a number of ways. Each decomposition introduces one or more divisions into the code stream representing the image. These divisions appear as distinct segments (or partitions) of the code stream produced by the compressions process. Different ordering of these segments into a code stream can provide different advantages and degrees of usefulness. For example, where image data is displayed as the data is read, some segment ordering may result in a display, which is progressive by quality. This is often used for images sourced over the Internet and displayed directly on a browser. Other segment orderings may provide a code stream, which is progressive by resolution, by spatial location, or by component (e.g. luminance then chrominance). Other orders may be chosen to match the order that minimizes buffering requirements of the encoder or decoder.

Maintaining a code stream as a set of segments allows to be readily parsed from one form to another. One problem or disadvantage with this approach however is that there quickly becomes a significant number of segments comprising the code stream. The decoder must be able to work out where each of these segments belongs in the decode process. Signalling this information explicitly for each segment leads to an unacceptable overhead. On the other hand, limiting the code stream to a few specific orderings is often too restrictive.

Thus, a need clearly exists for an improved method of processing a code stream that is able to substantially overcome, or at least ameliorate, one or more disadvantages of existing arrangements.

SUMMARY

In accordance with a first aspect of the invention, a method of signalling a structure of a code stream comprising a plurality of code segments is disclosed. The method comprises the steps of:

determining a code segment indexing order based on a reference order for code segments and a set of permutation values for modifying ordering of indices of reference order; and using code segment indexing order for signalling structure of code stream.

Preferably, the method further comprises the steps of:

providing reference order for code segments; and providing set of permutation values. The reference order may be a predetermined order of divisions permitting incremental decoding. Further, the reference order may be dependent upon a predetermined coding process for producing code stream.

Preferably, structure of code stream is signalled to a decoder.

The code stream may relate to a decomposed, digital image. Alternatively, code stream may include at least one of audio and video data.

Preferably, each code segment in reference order is uniquely located using an N-dimensional vector, where N is an integer. Each index of vector is independent of a subsequent index in order. Still further, an index of each code segment may vary from an index of a previous code segment by one location in one dimension. N may be equal to six and indices of said vector may correspond to tile, component, resolution level, subband, block, and layer.

Preferably, set of permutation values is a permutation vector of reorganized indices of reference order.

Optionally, set of permutation values is a permutation vector of reorganized indices of resolution level, component, tile, subband, block, and layer.

In accordance with a second aspect of the invention, an apparatus of signalling a structure of a code stream comprises a plurality of code segments is disclosed. The apparatus comprises:

a device for determining a code segment indexing order based on a reference order for code segments and a set of permutation values for modifying ordering of indices of reference order; and a device for using code segment indexing order for signalling structure of code stream.

In accordance with a third aspect of the invention, a computer program product having a computer readable medium having a computer program recorded therein for signalling a structure of a code stream comprising a plurality of code segments is disclosed. The computer program product comprises:

a computer readable program code module for determining a code segment indexing order based on a reference order for code segments and a set of permutation values for modifying ordering of indices of reference order; and a computer readable program code module for using code segment indexing order for signalling structure of code stream.

In accordance with a fourth aspect of the invention, a method of indicating an ordering of code segments in a code stream is disclosed. The code stream is arranged in code stream in one of a plurality of ordered arrangements defined by indices. The method comprises the steps of:

associating a set of N-indices with each code segment, wherein each code segment is uniquely identified by N-indices;

providing a reference order for N-indices and a predetermined incrementing process for sequencing through N-indices;

providing a set of permutation values for modifying ordering of N-indices of reference order;

determining a code segment order from permutation values and reference order, and using code segment order and predetermined incrementing process to indicate ordering of code segments in code stream.

Preferably, predetermined incrementing process is performed in a right to left fashion.

More preferably, predetermined incrementing process comprises the step of:

incrementing an index from least significant to most significant index within an allowed range of indices for a valid code segment.

Preferably, reference order is a predetermined order of divisions permitting incremental decoding.

Preferably, reference order is dependent upon a predetermined coding process for producing code stream.

Preferably, each index of set of N-indices is independent of a subsequent index in order and varies from an index of a previous code segment by one location in one dimension. Further, the set of permutation values is a permutation vector of reorganized indices of reference order.

In accordance with a fifth aspect of the invention, an apparatus for indicating an ordering of code segments in a code stream is disclosed. The code stream is arranged in code stream in one of a plurality of ordered arrangements defined by indices. The apparatus comprises:

a device for associating a set of N-indices with each code segment, wherein each code segment is uniquely identified by N-indices;

a device for providing a reference order for N-indices and a predetermined incrementing process for sequencing through N-indices;

a device for providing a set of permutation values for modifying ordering of N-indices of reference order;

a device for determining a code segment order from permutation values and reference order; and a device for using code segment order and predetermined incrementing process to indicate ordering of code segments in code stream.

In accordance with a sixth aspect of the invention, a computer program product having a computer readable medium having a computer program recorded therein for indicating an ordering of code segments in a code stream is disclosed. The code stream is arranged in code stream in one of a plurality of ordered arrangements defined by indices. The computer program product comprises:

a computer readable program code module for associating a set of N-indices with each code segment, wherein each code segment is uniquely identified by N-indices;

a computer readable program code module for providing a reference order for N-indices and a predetermined incrementing process for sequencing through N-indices;

a computer readable program code module for providing a set of permutation values for modifying ordering of N-indices of reference order;

a computer readable program code module for determining a code segment order from permutation values and reference order; and a computer readable program code module for using code segment order and predetermined incrementing process to indicate ordering of code segments in code stream.

BRIEF DESCRIPTION OF THE DRAWINGS

A small number of embodiments of the present invention are described hereinafter with reference to the drawings, in which.

DETAILED DESCRIPTION

A method, an apparatus, and a computer program product are described for signalling a structure of a code stream. Further, a method, an apparatus, and a computer program product are described for indicating an ordering of code segments in a code stream. In the following description, numerous specific details including particular transforms are described. However, it will be appreciated by those skilled in the art that changes and/or modifications can be made in view of this disclosure without departing from the scope and spirit of the invention. In other cases, details of well known features have not been specified so as not to obscure the invention.

Where reference is made in any one or more of the accompanying drawings to steps and/or features, which have the same reference numerals, those steps and/or features have for the purposes of this description the same function (s) or operation(s), unless the contrary intention appears.

1.0 Computer Implementation

Figure 1:
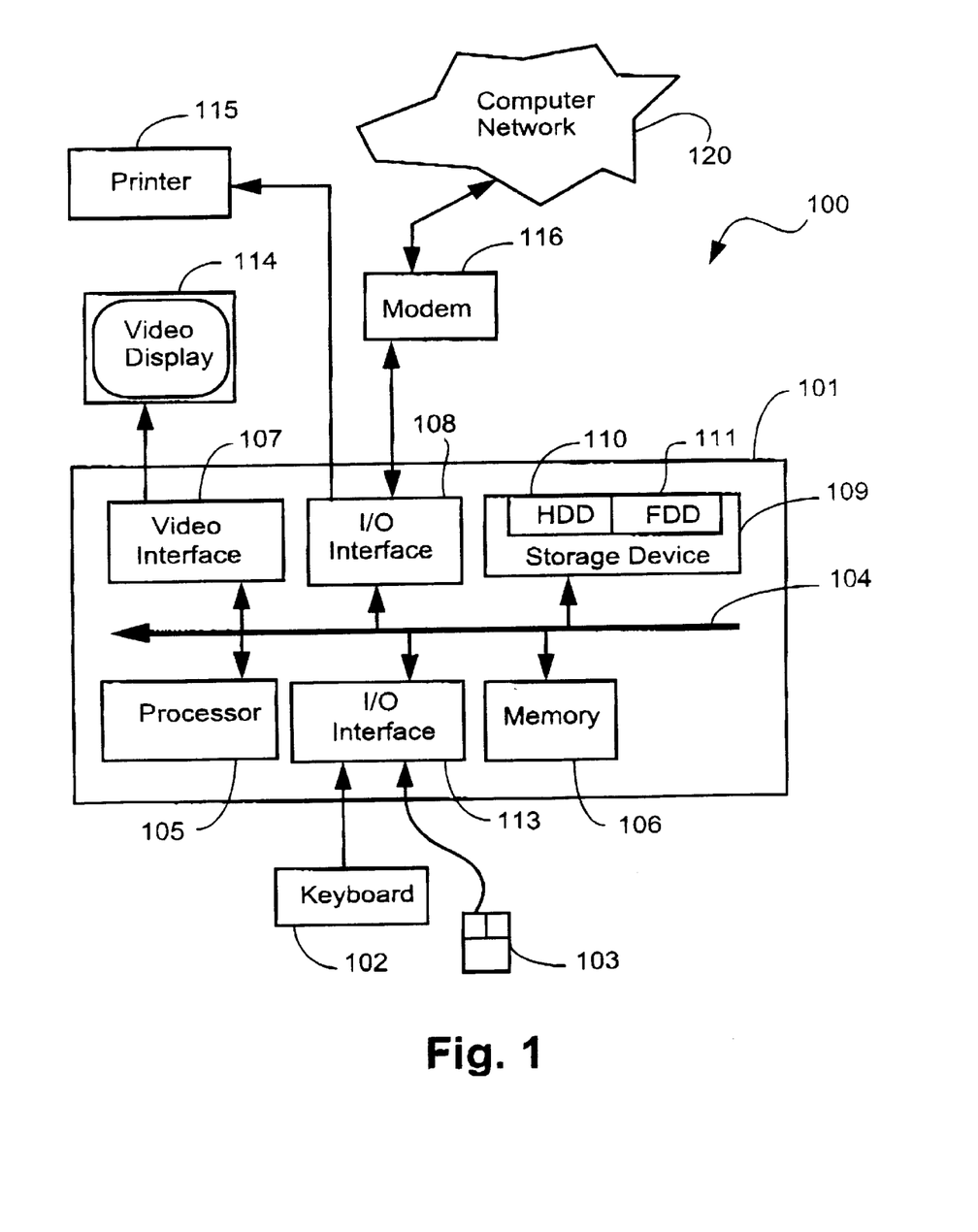
FIG. 1 is a schematic block diagram of a general-purpose computer with which the embodiments of the present invention can be practiced.

The embodiments of the invention can preferably be practiced using a general-purpose computer, such as the one shown in FIG. 1, wherein the processes of FIGS. 2 to 5 may be implemented as software executing on the computer. In particular, the steps of the encoding, decoding and/or transcoding methods are effected by instructions in the software that are carried out by the computer. The coding process for providing signalling to of the structure of a code stream representing a digital image may also be implemented by instructions in software carried out by the computer. The software may be stored in a computer readable medium, including the storage devices described below, for example The software is loaded into the computer from the computer readable medium, and then executed by the computer. A computer readable medium having such software or computer program recorded on the medium is a computer program product. The use of the computer program product in the computer preferably effects an advantageous apparatus for encoding digital images, decoding or signalling the structure coded representations of digital images in accordance with the embodiments of the invention.

The computer system 100 consists of the computer 101, a video display 114, and input devices 102, 103. In addition, the computer system 100 can have any of a number of other output devices 115 including line printers, laser printers, plotters, and other reproduction devices connected to the computer 101. The computer system 100 can be connected to one or more other computers using an appropriate communication channel via a modem 116, a computer network 120, or the like. The computer network may include a local area network (LAN), a wide area network (WAN), an Intranet, and/or the Internet.

The computer 101 itself includes a central processing unit(s) (simply referred to as a processor hereinafter) 105, a memory 106 which may include random access memory (RAM) and read-only memory (ROM), an input/output (IO) interface 108, a video interface 107, and one or more storage devices generally represented by a block 109 in, FIG. 1. The storage device(s) 109 can include one or more of the following: a floppy disc 111, a hard disc drive 110, a magneto-optical disc drive, CD-ROM, magnetic tape or any other of a number of non-volatile storage devices well known to those skilled in the art. Each of the components 105 to 113 is typically connected to one or more of the other devices via a bus 104 that in turn can consist of data, address, and control buses.

The video interface 107 is corrected to the video display 114 and provides video signals from the computer 101 for display on the video display 114. User input to operate the computer 101 can be provided by one or more input devices. For example, an operator can use the keyboard 102 and/or a pointing device such as the mouse 103 to provide input to the computer 101.

The system 100 is simply provided for illustrative purposes and other configurations can be employed without departing from the scope and spirit of the invention. Examples of computers on which the embodiment can be practiced include IBM-PC/ATs or compatibles, one of the Macintosh (TM) family of PCs, Sun Sparcstation (TM), or the like. The foregoing are merely examples of the types of computers with which the embodiments of the invention may be practiced. Typically, the processes of the embodiments, described hereinafter, are resident as software or a program recorded on a hard disk drive (generally depicted as block 110 in FIG. 1) as the computer readable medium, and read and controlled using the processor 105. Intermediate storage of the program and pixel data and any data fetched from the network may be accomplished using the semiconductor memory 106, possibly in concert with the hard disk drive 110.

In some instances, the program may be supplied to the user encoded on a CD-ROM or a floppy disk (both generally depicted by block 109), or alternatively could be read by the user from the network via a modern device connected to the computer, for example. Still further, the software can also be loaded into the computer system 100 from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing are merely examples of relevant computer readable mediums. Other computer readable mediums may be practiced without departing from the scope and spirit of the invention.

The embodiments of the coding method may alternatively be implemented In dedicated hardware such as one or more integrated circuits performing the functions or sub-functions of the encoding, decoding or signalling processes. Such dedicated hardware may include ASICs and associated on-chip memories.

2.1 Example Coding Model

Figure 2:
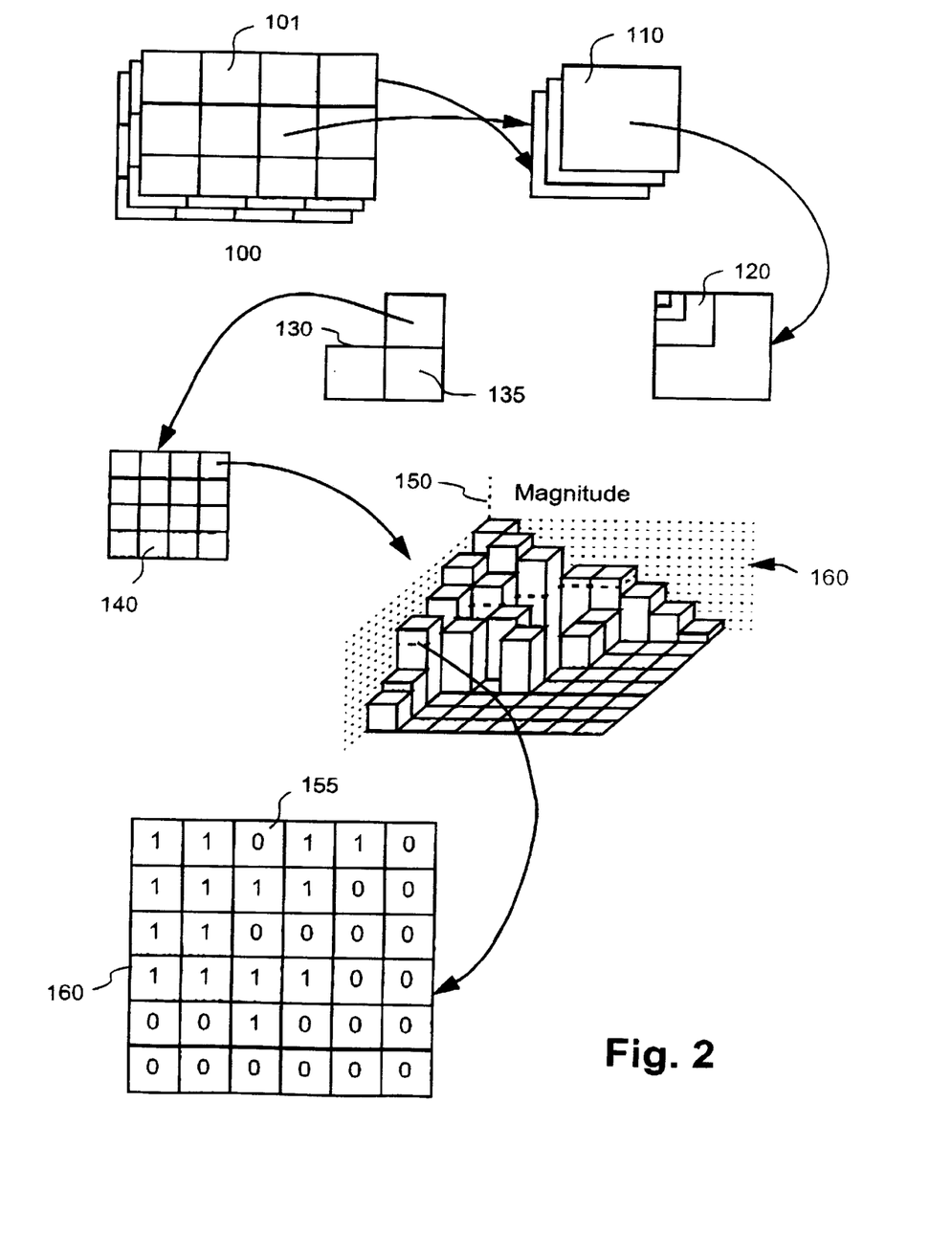
FIG. 2 is a diagram illustrating a coding model adopted for implementing a preferred embodiment of the present invention.

Referring to FIG. 2, there are shown various steps of an exemplary coding model implemented in the preferred embodiment of the invention. An image 100 is divided spatially into a collection of regular rectangular regions hereafter referred to as tiles. Coding is such that each tile can be independently decoded. Each tile 101 is divided into a number of component planes 110 and coded in such a way that each plane may be decoded independently. The component planes 110 typically represent image components in a colour space, for example, luminance and two chrominance planes. Other component planes can be used such as RGB (Red, Green and Blue) component planes prior to compression.

The encoding process involves transforming each tile component into a multi-resolution basis. This leads to a number of divisions 120 in such a form that each resolution can be decoded incrementally. A wavelet transform is a transform commonly used for this purpose in both image and audio coding. However, other forms of transforms may be practiced without departing from the scope and spirit of the invention. A resolution level 130 comprises one or more subbands 135 containing a plurality of transform coefficients. Subbands 135 are further divided into blocks 140 of coefficients. each of which is coded substantially independently of all other coefficient blocks.

The coefficient magnitudes within each block may be viewed as a topological map in which the height is a function of magnitude 150 of a coefficient. If coefficients magnitudes are expressed as integers and the mapping function is $$\text{Height} = \log_2 (\text{magnitude}) \quad (1)$$

($\log_2$=logarithm base 2), then the height is the number of bits required to express the magnitude of the coefficients. A plane perpendicular to the magnitude axis and parallel to the spatial plane of this block topology defines an array of bit values that represent a layer or bit-plane 160 of the block of coefficients. The number of bit planes that can be defined in a block is equal to the number of bits used to represent the coefficient with greatest magnitude. In the coding model of FIG. 2, each bit-plane is encoded in sequence from the most significant (numbered zero) to the least significant using an arithmetic entropy encoding technique.

Lossy coding results both from quantisation of the coefficient values to integers and truncation of the coding process at some arbitrary bit-plane prior to the least significant bit plane. However lossless coding can be performed by careful selection of a transform and coding all bit-planes without truncation. A collection of bit-planes from all blocks at a specified magnitude are referred to as a "layer" 155. This leads to a set of (layer) divisions in such a form that a number of distinct quality levels can be decoded incrementally. The described technique of forming layers is purely exemplary and other more methods can be used. For example more complex methods may include fractional bit-planes and global rate-distortion optimization based on some arbitrary quality metric techniques.

2.2 Defining a Scan Order

Figure 3:
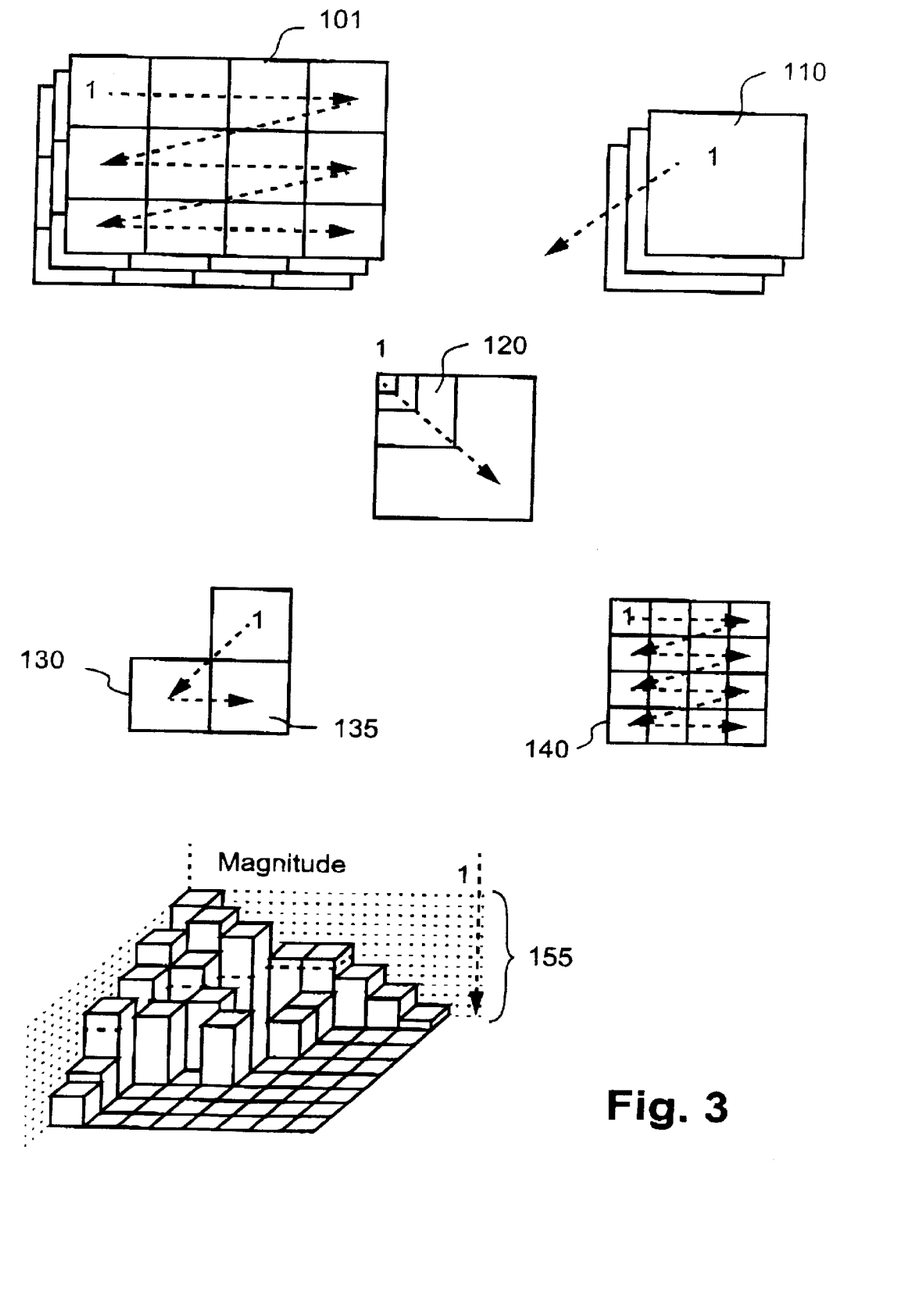
FIG. 3 is a diagram illustrating a scan order in accordance with the preferred embodiment.

Referring now to FIG. 3, there is shown a typical set of scan orders for tile 101, components 110, resolution levels 120, subbands 135, blocks 140 and layers 155 of the coding model previously described. A code stream comprises a plurality of code segments arranged in the code stream in a predetermined order. Each code segment (or division of the code stream) includes a portion of data such that the collection of code segments in a code stream represents a digital image. Alternately, the code stream may represent audio or video data, and each code segment includes a portion of that data. A code stream may include information about the structure of the code stream or code segments, typically in the form of a header in the code stream. This information is information sufficient for a decoder to determine the number and relation between each type of division present.

In the present embodiment, a predetermined order of all the divisions is outlined by the arrows in FIG. 2 (ie tiles, components, resolution, levels, subbands, blocks, layers etc). This order is referred to herein as a reference order. The reference order may be arbitrary and is assumed to be fixed for any given coding scheme (model) and known to both an encoder and corresponding decoder of a code stream implicitly.

2.3 Indexing the Code Space

The code stream is assumed to reside in an N-dimensional code space and each code segment referenced using a unique N-dimensional (N-D) index vector. Each indice corresponds to an axis in the code space. Incrementing along any axis moves to the next instance of that division according to the (its) scan order. For example, moving one place along the tile axis implies a move to (at least part of) the code for the next tile. This implies that each of the code space axes is discrete. In the above described (section 2.1) coding scheme (model) provided, each code segment is located in the code space according to a 6-D vector of the form $$b = [\text{tile, component, level, subband, block, layer}] \quad (2)$$

Note that the order of indices in this vector reflects the hierarchy of processing stages in the coding process as depicted in FIG. 2. The indices and the manner in which the indices are incremented also defines an ordering of code segments in a code stream. The order is said to be a causal order (or ordering) as the range of any element i is not dependent on any other element j where j>i. That is, an element in a sequentially ordered list of elements may be dependent on another element of the list which precedes the first mentioned element, but cannot be dependent on an element that may follow the first mentioned element in the ordered list. There may be more than one causal order for any given coding method.

2.4 Forming a Code Stream

A code stream comprises a sequence of code segments. A single causal order is selected as a reference order for scanning the code space and, hence, ordering the code segments to form a code stream.

To minimize the signalling overhead associated with code segment orders other than the reference order, a constraint is imposed upon the differing ways in which code segments appear in a code stream. The set of possible orderings of code segments in the present embodiment is such that an index of each code segment varies from an index of a previous (or adjacent) code segment by only one location in one dimension.

The reference ordering of code segments based on hierarchy of divisions introduced during the process of encoding described in Section 2.1 "Example coding model" and the index of equation (2). A logical sequence of the pseudo-code for incrementing the code segment index vector described hereinafter (in Section 2.5 "Signalling the Structure") is:

for each value of the first index (resolution level) in scan order
  for each value of the second index (component) in scan order
    for each value of the third index (tile) in scan order
      for each value of the fourth index (subband) in scan order
        for each value of the fifth index (block) in scan order
          for each value of the sixth index (layer) in scan order
            code-segment[b'] appears That is, the right-most (or sixth) index of equation (3) is incremented to its full extent (which may be dependent on the context specified by the other indices). The right-most (6th) index is then reset and the next (5th) index is incremented and so on until each index in turn has reached its full extent. The operation described above is referred to as "incrementing the index". This incrementing the index technique is analogous to incrementing a multi-digit number.

2.5 Signalling the Structure

The constraint imposed on the code segment ordering described above under the heading "Forming a code stream" (Section 2.4), for any of the possible (permitted) code segment orders conveniently allows a definition of a permutation vector. The permutation vector is used to permute or modify the ordering of the indices of equation (2) to define or generated a new vector (code segment index vector) for a different ordering of the code segments in the code stream.

Figure 5:
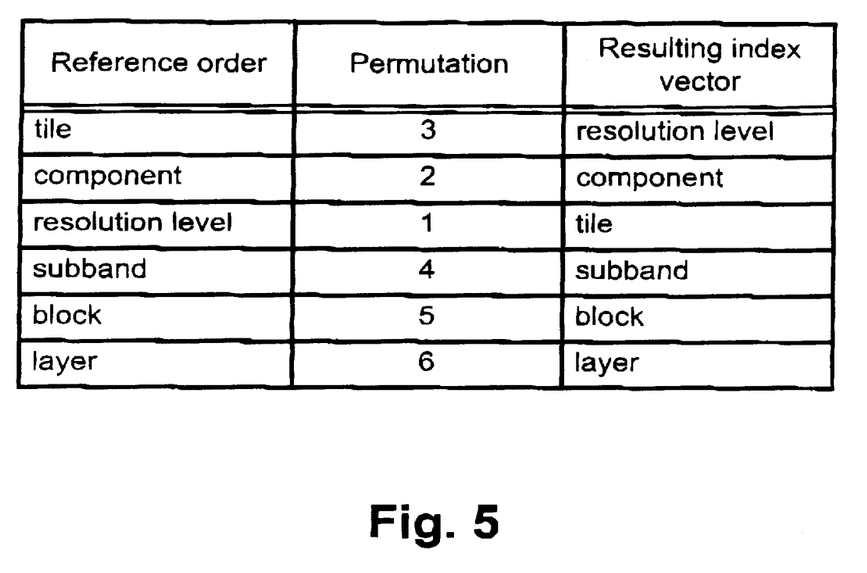
FIG. 5 shows in tabular form a reference order, a permutation look-up table (vector) and a code segment index vector according to the preferred embodiment.

The order of code segments in a code-stream can now be indicated by a permutation of the reference ordering using code segment index vector. An example of the permutation vector is shown in FIG. 5. The reference order (as per equation (2)) is shown as tile, component, resolution level, subband, block, layer and the permutation vector as 3, 2, 1, 4, 5, 6. The code segment index vector ("index vector" in FIG. 5) is generated from the reference order using the permutation vector as follows. The value three "3" in the first position of the permutation vector indicates that the third index (resolution level) of the reference order is to be the first index of the index vector. A next entry of the permutation vector is two "2" thus the second index of the reference order (component) is to be the second index of the index vector. Continuing in this manner the last index of the index vector is "layer", because according to the permutation vector the sixth (6th) reference order index is the last index of the (new) index vector. If the newly generated index vector (code segment index vector) is incremented in the same manner as previously described in section "Forming a code stream", the formed code stream has a new code segment ordering according to the code segment index vector. Therefore, a decoder requiring the structure of the newly formed code stream only needs to know the permutation vector to determine the code segment index vector (and the structure) since as previously described, both the encoder and decoder know the reference order implicitly. Equation (3) below shows the (new) index vector, b' (b-prime):

$$b' = [\text{level, component, tile, subband, block, layer}] \quad (3)$$

2.6 Incrementing the Index Vector

In the more general context of non-causal permutations of the index vector, increments should still preferably be performed in right to left fashion as described above. In this case however provision needs to be made to account for gaps in a sequence, If any.

Figure 4:
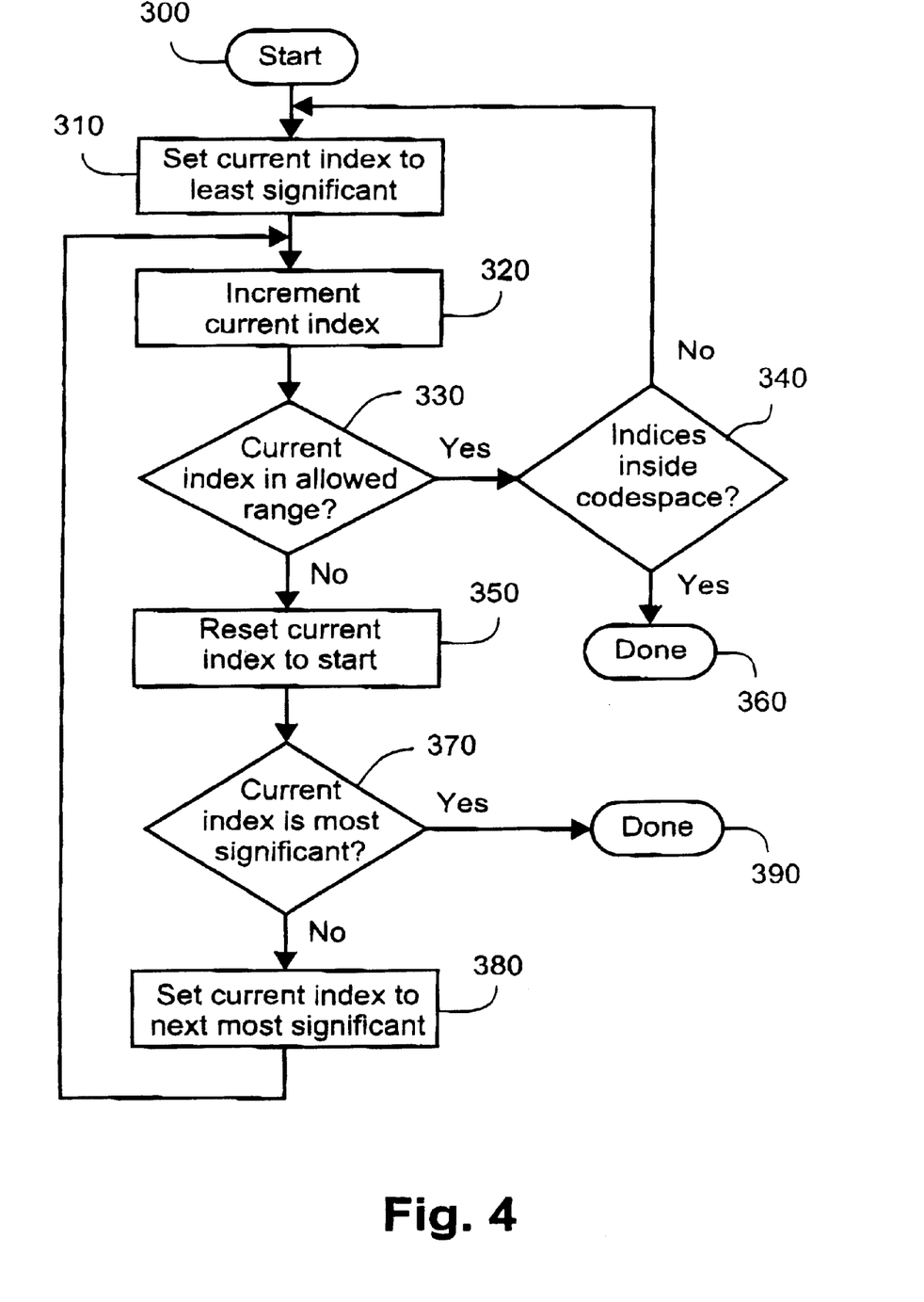
FIG. 4 is a flow diagram illustrating an indexing in a non-causal ordering in accordance with the preferred embodiment.

A process for incrementing the index where non-causal permutations of the reference order are used is described with reference to FIG. 4. The process starts at step 300. As a first step a pointer to a current index is initialised to point to the least significant (or right-most or last index) index at step 310. The current index is subsequently incremented at step 320. In decision step 330, a check is made to determine whether or not the current index is within the allowed range for a (new current) index. The allowed range for the index is irrespective of the values of the remaining indices and simply represents the range of values that that index is able to take over the entire code space. If the decision step 330 returns true, then decision step 340 is entered. At decision step 340, a check is performed to determine whether or not the set of indices reference a valid code segment. The decision in block 340 is determined from information (as previously described) provided in a header of the code stream. If decision block 340 return "yes" (true), then the process terminates at step 360.

If incrementing the current index places the index outside the range of allowed values (i.e. block 330 returns "no", false), the (current) index is reset to the start of its allowed range (at step 350). If the current index is a left-most index (i.e. the first index or most significant index), which is tested at decision step 370, this represents the end of the sequence and the process terminates at step 390. If not, that is step 370 returns "no" or false, the current index is set to be a next most significant index at step 380 and processing is returned to step 320.

If at any stage the incremented index falls within an allowed range, but the resulting set of indices does not reference a code segment (i.e. decision block 340 returns "no" or false), processing is returned to block 310 and processing continues as previously described with reference to step 320.

Those skilled in the art will recognise that other coding models can be used without departing from the scope or spirit of the present invention. For example, the JPEG (Joint Photographic Expert Group) standard divides an image into 8×8 pixel blocks, which are subsequently transformed and scanned in the known Zig-Zag manner.

Thus, a method, an apparatus, and a computer program product have been described for signalling a structure of a code stream. Further, a method, an apparatus, and a computer program product have been described for indicating an ordering of code segments in a code stream. The foregoing only describes a small number of embodiments of the present invention, however, modifications and/or changes can be made thereto without departing from the scope and spirit of the invention. The present embodiments are, therefore, to be considered in all respects to be illustrative and restrictive. In the context of this specification, the word "comprising" means "including principally but not necessarily solely" or "having" or "including" and not "consisting only of". Variations of the word comprising, such as "comprise" and "comprises" having corresponding meanings.

I claim:

1. A method of signalling a structure of a code stream comprising a plurality of code segments, said method comprising the steps of:
   determining a code segment indexing order based on a reference order for said code segments and a set of permutation values for modifying ordering of indices of said reference order; and
   using said code segment indexing order for signalling said structure of said code stream.

2. The method according to claim 1, further comprising the steps of:
   providing said reference order for said code segments; and
   providing said set of permutation values.

3. The method according to claim 2, wherein said reference order is a predetermined order of divisions permitting incremental decoding.

4. The method according to claim 2, wherein said reference order is dependent upon a predetermined coding process for producing said code stream.

5. The method according to claim 1, wherein said structure of said code stream is signalled to a decoder.

6. The method according to claim 1, wherein said code stream relates to a decomposed, digital image.

7. The method according to claim 1, wherein said code stream includes at least one of audio and video data.

8. The method according to claim 1, wherein each code segment in said reference order is uniquely located using an N-dimensional vector, where N is an integer and each index of said vector is independent of a subsequent index in order.

9. The method according to claim 8, wherein an index of each code segment varies from an index of a previous code segment by one location in one dimension.

10. The method according to claim 8, wherein N is equal to six and indices of said vector correspond to tile, component, resolution level, subband, block, and layer.

11. The method according to claim 8, wherein said set of permutation values is a permutation vector of reorganized indices of said reference order.

12. The method according to claim 10, wherein said set of permutation values is a permutation vector of reorganized indices of resolution level, component, tile, subband, block, and layer.

13. An apparatus of signalling a structure of a code stream comprising a plurality of code segments, said apparatus comprising:
   means for determining a code segment indexing order based on a reference order for said code segments and a set of permutation values for modifying ordering of indices of said reference order; and
   means for using said code segment indexing order for signalling said structure of said code stream.

14. The apparatus according to claim 13, further comprising:
   means for providing said reference order for said code segments; and
   means for providing said set of permutation values.

15. The apparatus according to claim 14, wherein said reference order is a predetermined order of divisions permitting incremental decoding.

16. The apparatus according to claim 14, wherein said reference order is dependent upon a predetermined coding process for producing said code stream.

17. The apparatus according to claim 13, wherein said structure of said code stream is signalled to a decoder.

18. The apparatus according to claim 13, wherein said code stream relates to a decomposed, digital image.

19. The apparatus according to claim 13, wherein said code stream includes at least one of audio and video data.

20. The apparatus according to claim 13, wherein each code segment in said reference order is uniquely located using an N-dimensional vector, where N is an integer. and each index of said vector is independent of a subsequent index in order.

21. The apparatus according to claim 20, wherein an index of each code segment varies from an index of a previous code segment by one location in one dimension.

22. The apparatus according to claim 20, wherein N is equal to six and indices of said vector correspond to tile, component, resolution level, subband, block, and layer.

23. The apparatus according to claim 20, wherein said set of permutation values is a permutation vector of reorganized indices of said reference order.

24. The apparatus according to claim 22, wherein said set of permutation values is a permutation vector of reorganized indices of resolution level, component, tile, subband, block, and layer.

25. A computer program product having a computer readable medium having a computer program recorded therein for signalling a structure of a code stream comprising a plurality of code segments, said computer program product comprising:
   computer readable program code means for determining a code segment indexing order based on a reference order for said code segments and a set of permutation values for modifying ordering of indices of said reference order; and
   computer readable program code means for using said code segment indexing order for signalling said structure of said code stream.

26. The computer program product according to claim 25, further comprising:
   computer readable program code means for providing said reference order for said code segments; and
   computer readable program code means for providing said set of permutation values.

27. The computer program product according to claim 26, wherein said reference order is a predetermined order of divisions permitting incremental decoding.

28. The computer program product according to claim 26, wherein said reference order is dependent upon a predetermined coding process for producing said code stream.

29. The computer program product according to claim 25, wherein said structure of said code stream is signalled to a decoder.

30. The computer program product according to claim 25, wherein said code stream relates to a decomposed, digital image.

31. The computer program product according to claim 25, wherein said code stream includes at least one of audio and video data.

32. The computer program product according to claim 25, wherein each code segment in said reference order is uniquely located using an N-dimensional vector, where N is an integer, and each index of said vector is independent of a subsequent index in order.

33. The computer program product according to claim 32, wherein an index of each code segment varies from an index of a previous code segment by one location in one dimension.

34. The computer program product according to claim 32, wherein N is equal to six and indices of said vector correspond to tile, component, resolution level, subband, block, and layer.

35. The computer program product according to claim 32, wherein said set of permutation values is a permutation vector of reorganized indices of said reference order.

36. The computer program product according to claim 34, wherein said set of permutation values is a permutation vector of reorganized indices of resolution level, component, tile, subband, block, and layer.

37. A method of indicating an ordering of code segments in a code stream, said code stream being arranged in said code stream in one of a plurality of ordered arrangements defined by indices, said method comprising the steps of:
- associating a set of N-indices with each code segment, wherein each code segment is uniquely identified by said N-indices;
- providing a reference order for said N-indices and a predetermined incrementing process for sequencing through said N-indices;
- providing a set of permutation values for modifying ordering of N-indices of said reference order, determining a code segment order from said permutation values and said reference order; and
- using said code segment order and said predetermined incrementing process to indicate said ordering of said code segments in said code stream.

38. The method according to claim 37, wherein said predetermined incrementing process is performed in a right to left fashion.

39. The method according to claim 37, wherein said predetermined incrementing process comprises the step of:
- incrementing an index from least significant to most significant index within an allowed range of indices for a valid code segment.

40. The method according to claim 37, wherein said reference order is a predetermined order of divisions permitting incremental decoding.

41. The method according to claim 37, wherein said reference order is dependent upon a predetermined coding process for producing said code stream.

42. The method according to claim 37, wherein each index of said set of N-indices is independent of a subsequent index in order and varies from an index of a previous code segment by one location in one dimension.

43. The method according to claim 42, wherein said set of permutation values is a permutation vector of reorganized indices of said reference order.

44. An apparatus for indicating an ordering of code segments in a code stream, said code stream being arranged in said code stream in one of a plurality of ordered arrangements defined by indices, said apparatus comprising:
- means for associating a set of N-indices with each code segment, wherein each code segment is uniquely identified by said N-indices;
- means for providing a reference order for said N-indices and a predetermined incrementing process for sequencing through said N-indices;
- means for providing a set of permutation values for modifying ordering of N-indices of said reference order;
- means for determining a code segment order from said permutation values and said reference order; and
- means for using said code segment order and said predetermined incrementing process to indicate said ordering of said code segments in said code stream.

45. The apparatus according to claim 44, wherein said predetermined incrementing process is performed in a right to left fashion.

46. The apparatus according to claim 44, wherein said predetermined incrementing process utilizes:
- means for incrementing an index from least significant to most significant index within an allowed range of indices for a valid code segment.

47. The apparatus according to claim 44, wherein said reference order is a predetermined order of divisions permitting incremental decoding.

48. The apparatus according to claim 44, wherein said reference order is dependent upon a predetermined coding process for producing said code stream.

49. The apparatus according to claim 44, wherein each index of said set of N-indices is independent of a subsequent index in order and varies from an index of a previous code segment by one location in one dimension.

50. The apparatus according to claim 49, wherein said set of permutation values is a permutation vector of reorganized indices of said reference order.

51. A computer program product having a computer readable medium having a computer program recorded therein for indicating an ordering of code segments in a code stream, said code stream being arranged in said code stream in one of a plurality of ordered arrangements defined by indices, said computer program product comprising:
- computer readable program code means for associating a set of N-indices with each code segment, wherein each code segment is uniquely identified by said N-indices;
- computer readable program code means for providing a reference order for said N-indices and a predetermined incrementing process for sequencing through said N-indices;
- computer readable program code means for providing a set of permutation values for modifying ordering of N-indices of said reference order;
- computer readable program code means for determining a code segment order from said permutation values and said reference order; and
- computer readable program code means for using said code segment order and said predetermined incrementing process to indicate said ordering of said code segments in said code stream.

52. The computer program product according to claim 51, wherein said predetermined incrementing process is performed in a right to left fashion.

53. The computer program product according to claim 51, wherein said predetermined incrementing process utilizes:

computer readable program code means for incrementing an index from least significant to most significant index within an allowed range of indices for a valid code segment.

54. The computer program product according to claim 51, wherein said reference order is a predetermined order of divisions permitting incremental decoding.

55. The computer program product according to claim 51, wherein said reference order is dependent upon a predetermined coding process for producing said code stream.

56. The computer program product according to claim 51, wherein each index of said set of N-indices is independent of a subsequent index in order and varies from an index of a previous code segment by one location in one dimension.

57. The computer program product according to claim 56, wherein said set of permutation values is a permutation vector of reorganized indices of said reference order.

* * * * *

UNITED STATES PATENT AND TRADEMARK OFFICE
CERTIFICATE OF CORRECTION

PATENT NO. : 6,411,222 B1
DATED : June 25, 2002
INVENTOR(S) : Andrew James Dorrell It is certified that error appears in the above-identified patent and that said Letters Patent is hereby corrected as shown below:

Column 1,
Line 16, "compressions" should read -- compression --; and
Line 28, "to" should read -- the code stream to --.

Column 2,
Line 15, "stream" should read -- stream that --.

Column 4,
Line 27, "to of" should read -- representing --.

Column 5,
Line 29, "medium" should read -- mediums --; and
Line 33, "email" should read -- e-mail --.

Column 6,
Line 6, "coefficients" should read -- coefficient --;
Line 27, "are" should read -- is --;
Line 31, "more" should be deleted; and
Line 62, "indice" should read -- index --.

Column 7,
Line 63, "generated" should read -- generate --.

Column 8,
Line 53, "return" should read -- returns --.

UNITED STATES PATENT AND TRADEMARK OFFICE
CERTIFICATE OF CORRECTION

PATENT NO.     : 6,411,222 B1
DATED          : June 25, 2002
INVENTOR(S)    : Andrew James Dorrell It is certified that error appears in the above-identified patent and that said Letters Patent is hereby corrected as shown below:

<u>Column 9,</u>
Line 23, "having" should read -- have --.

Signed and Sealed this

Nineteenth Day of August, 2003

JAMES E. ROGAN
*Director of the United States Patent and Trademark Office*